United States Patent
Wang et al.

(10) Patent No.: US 11,498,085 B2
(45) Date of Patent: Nov. 15, 2022

(54) PORTABLE PESTICIDE APPLICATION EQUIPMENT WITH ACCURATE APPLICATION

(71) Applicant: Tobacco Research Institute of Chinese Academy of Agricultural Sciences, Qingdao (CN)

(72) Inventors: Xiuguo Wang, Qingdao (CN); Tong Liu, Qingdao (CN); Xiao Zheng, Qingdao (CN); Guangwei Ren, Qingdao (CN); Yalei Liu, Qingdao (CN); Kuan Fang, Qingdao (CN)

(73) Assignee: Tobacco Research Institute of Chinese Academy of Agricultural Sciences, Shandong (CN)

( * ) Notice: Subject to any disclaimer, the term of this patent is extended or adjusted under 35 U.S.C. 154(b) by 285 days.

(21) Appl. No.: 16/876,392

(22) Filed: May 18, 2020

(65) Prior Publication Data
US 2021/0153494 A1    May 27, 2021

(51) Int. Cl.
| | | |
|---|---|---|
| *A01M 17/00* | (2006.01) | |
| *B05B 1/20* | (2006.01) | |
| *A01M 7/00* | (2006.01) | |
| *A01B 63/00* | (2006.01) | |

(52) U.S. Cl.
CPC ............. *B05B 1/20* (2013.01); *A01B 63/008* (2013.01); *A01M 7/006* (2013.01); *A01M 7/0017* (2013.01)

(58) Field of Classification Search
CPC ....... B05B 1/20; A01M 7/0017; A01M 7/006; A01B 63/008; A01C 15/16
See application file for complete search history.

(56) References Cited

U.S. PATENT DOCUMENTS

2019/0126308 A1\*    5/2019    Hendrickson ............. B05B 1/20

OTHER PUBLICATIONS

Li, Hong-wei, CN 203378437, "Portable Spray Head With Adjustable Spraying Vehicle" (translation), Jan. 8, 2014, 8 pgs <CN_203378437.pdf>.\*
Mori Toshiyuki, JP H05176605, "Marking Apparatus for Pesticide Scattering Vehicle", (translation) Jul. 20, 1993, 7 pgs <JP_H05176605.pdf>.\*
Ma, Qing-min, CN 207369598, "A Garden Efficient Fertilizer and Pesticide Spraying Device" (translation), May 18, 2018, 8 pgs< CN_207369598.pdf>.\*
Hou, Han-yao, CN 107278472, "A Garden Efficient Fertilizer and Pesticide Spraying Device" (translation), Oct. 24, 2017, 8 pgs <CN_107278472.pdf>.\*

\* cited by examiner

*Primary Examiner* — Tuan A Vu
(74) *Attorney, Agent, or Firm* — von Briesen & Roper, s.c.

(57) ABSTRACT

A portable pesticide application equipment with accurate application, which includes a pesticide tank. Rollers are arranged at the bottom of the pesticide tank. An inclined pesticide guide plate is arranged below the filter. A side connector is arranged at one side of the pesticide tank. The side connector is connected with a long hose. The long hose is connected with a pesticide discharging device. The pesticide discharging device includes a pesticide control box, two sides of which are hinged with a first iron handle and a second iron handle. A first nozzle is connected with the bottom end of the first iron handle while a second nozzle is connected with the bottom end of the second iron handle. The upper end of the first iron handle is inserted into a first support rod while the upper end of the second iron handle is inserted into a second support rod.

8 Claims, 2 Drawing Sheets

PORTABLE PESTICIDE APPLICATION EQUIPMENT WITH ACCURATE APPLICATION

TECHNICAL FIELD

The present invention relates to the technical field of pesticide application equipment, and in particular to, portable pesticide application equipment with accurate application.

BACKGROUND

Agriculture is very important to the economic development of China. Effective disease and pest control is crucial to improving the quality and the yield of crops. Currently the disease and pest control means mainly include agricultural, physical, biological and chemical control, where the chemical control is the most basic means. The chemical control include spray, irrigation, fumigation, broadcast and banded sprays. The broadcast and banded sprays as important granular pesticide processing manners are very important to control soil insects, soil-borne diseases, etc. However, broadcast and banded sprays of pesticide currently are still manually conducted. Such manual operation cannot achieve quantitative pesticide application and also has potential hazards to the health of applicators. Moreover, there are a few devices for pesticide application, but these devices are heavy, cannot apply the pesticide quantitatively, and are thus not suitable for home or rugged mountainous regions. Therefore, portable pesticide application equipment with accurate application is urgent for solving the problems in the prior art.

SUMMARY

To overcome shortcomings of the prior art, the present invention provides portable pesticide application equipment with accurate application.

The present invention provides the following technical solutions:

Portable pesticide application equipment with accurate application includes a pesticide tank. Rollers are arranged at the bottom of the pesticide tank. A filter is arranged in the pesticide tank. An inclined pesticide guide plate is arranged below the filter. A side connector is arranged at one side of the pesticide tank and also located between the filter and the pesticide guide plate. A valve device is arranged on the side connector while the side connector is connected with a long hose. The long hose is connected with a pesticide discharging device. The pesticide discharging device includes a pesticide control box, two sides of which are hinged with a first iron handle and a second iron handle. A first nozzle is connected with the bottom end of the first iron handle while a second nozzle is connected with the bottom end of the second iron handle, and the first nozzle fits the second nozzle. The upper end of the first iron handle is inserted into a first support rod while the upper end of the second iron handle is inserted into a second support rod. Bolts are respectively arranged on the first support rod and the second support rod to fix the first support rod and the first iron handle as well as the second support rod and the second iron handle. Handles are arranged at the tops of the first support rod and the second support rod.

Preferably, a feed port is arranged at the top of the pesticide tank, and two straps are arranged on one side of the pesticide tank.

Preferably, a cap is arranged at the feed port in a threaded connection manner.

Preferably, the pesticide guide plate as well as side walls and a bottom wall of the pesticide tank surround to define a storage cavity. A side door is hinged with one side, away from a side connector, of the storage cavity.

Preferably, an upper connector and a lower connector are respectively arranged at the top and the bottom of the pesticide control box. The upper connector is connected with the long hose while the lower connector is connected with a pesticide discharge tube. An outlet of the pesticide discharge tube is located between the first nozzle and the second nozzle.

Preferably, the valve device includes a transversely arranged horizontal tube, the axis of which is vertical to the axis of the side connector. One end of the horizontal tube is closed while the other end thereof is opened. A control part is arranged in the horizontal tube.

Preferably, first through holes are arranged in two sides vertical to the axis of the horizontal tube. A second through hole is arranged in the control part. A spring is connected with one end of the control part and the bottom wall of the horizontal tube while a valve handle is arranged at the other end of the control part.

Preferably, a locking plate is arranged at the opened end of the horizontal tube, and locking slots are arranged on the locking plate. When the control part is stretched and rotated by 90 degrees to ensure that two ends of the valve handle are locked in the locking slots, the first through holes and the second through hole are communicated.

The present invention has the following beneficial effects:

In the present invention, the rollers are arranged at the bottom of the pesticide tank to help the pesticide tank to move. Connection positions of the first iron handle and the first support rod as well as the second iron handle and the second support rod can be adjusted by the bolts such that the heights of the handles can be adjusted to fit a pesticide applicator in use. The filter is arranged in the pesticide tank to block agglomerated granules so as to facilitate precision application of the granules. The inclined pesticide guide plate is arranged in the pesticide tank to help the granules to discharge and also to define a storage cavity; the storage cavity can be used for storing small tools or a little spare pesticide and is convenient to use. Furthermore, the valve device is arranged on the side connector. In use, the control part is stretched and rotated by 90 degrees to ensure that the two ends of the valve handle are locked in the locking slots; at this time, the first through holes and the second through hole are communicated; thus the valve device is opened. If the valve device needs to be closed, the valve handle is stretched out of the locking slots; at this time, the control part resets under the action of the spring, and the axis of the second through hole is vertical to the first through hole; therefore, the valve device is convenient to use.

BRIEF DESCRIPTION OF THE DRAWINGS

The accompanying drawings are provided for further understanding and describing of the present invention.

Figure 1:
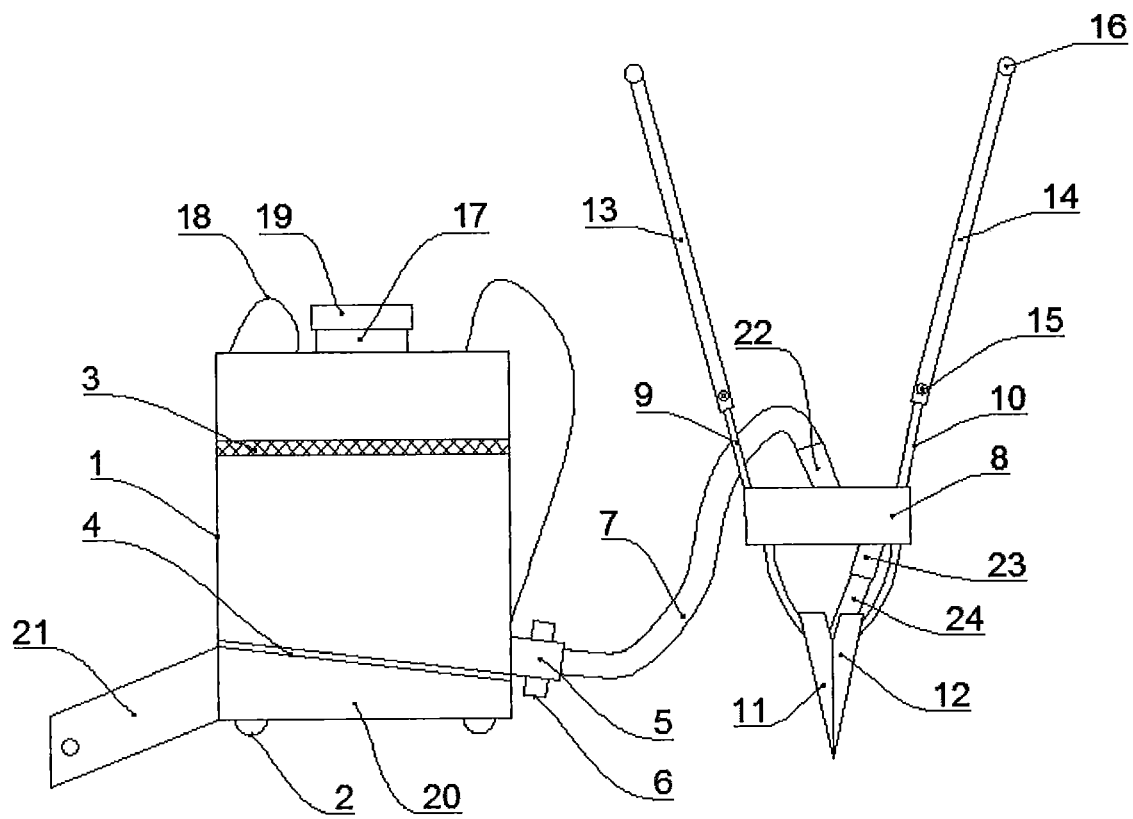
FIG. 1 is a schematic structural diagram of the present invention.

In the drawings: 1—pesticide tank, 2—rollers, 3—filter, 4—pesticide guide plate, 5—side connector, 6—valve device, 7—long hose, 8—pesticide control box, 9—first iron handle, 10—second iron handle, 11—first nozzle, 12—second nozzle, 13—first support rod, 14—second support rod, 15—bolt, 16—handle, 17—feed port, 18—strap, 19—cap, 20—storage cavity, 21—side door, 22—upper connector, 23—lower connector, 24—pesticide discharge tube, 25—horizontal tube, 26—control part, 27—first through hole, 28—second through hole, 29—spring, 30—valve handle, 31—locking plate, and 32—locking slot.

DETAILED DESCRIPTION

Figure 2:
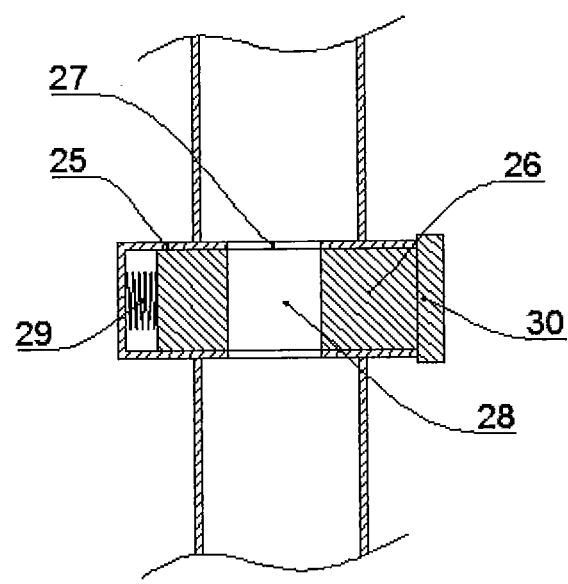
FIG. 2 is an internal schematic diagram of an opened valve device of the present invention.
Figure 3:
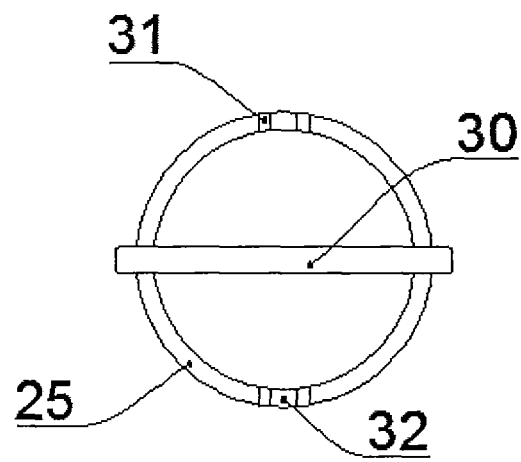
FIG. 3 is a side view of a closed valve device of the present invention.
Figure 4:
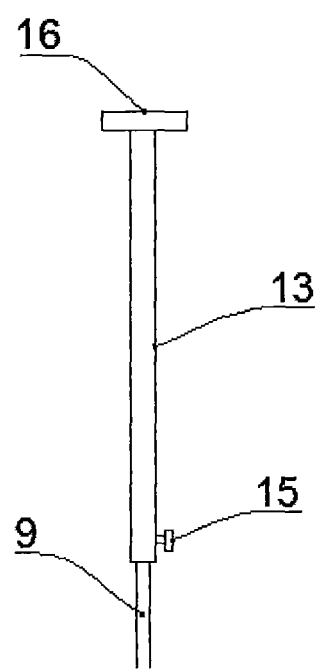
FIG. 4 is a schematic diagram showing connection of a first iron handle and a first support rod of the present invention.

As shown in FIG. 1 to FIG. 4, portable pesticide application equipment with accurate application includes a pesticide tank 1. Rollers 2 are arranged at the bottom of the pesticide tank 1, a feed port 17 is arranged at the top of the pesticide tank 1, and two straps 18 are arranged on one side of the pesticide tank 1. A cap 19 is arranged at the feed port 17 in a threaded connection manner.

A filter 3 is arranged in the pesticide tank 1, an inclined pesticide guide plate 4 is arranged below the filter 3, then the pesticide guide plate 4 as well as side walls and a bottom wall of the pesticide tank 1 surround to define a storage cavity 20. A side door 21 is hinged with one side, away from a side connector 5, of the storage cavity 20. The side connector 5 is arranged at one side of the pesticide tank 1 and also located between the filter 3 and the pesticide guide plate 4. A valve device 6 is arranged on the side connector 5 while the side connector 5 is connected with a long hose 7. The long hose 7 is connected with a pesticide discharging device. The valve device 6 includes a transversely arranged horizontal tube 25, the axis of which is vertical to the axis of the side connector 5. Specifically, one end of the horizontal tube 25 is closed while the other end thereof is opened. A control part 26 is arranged in the horizontal tube 25. First through holes 27 are arranged in two sides vertical to the axis of the horizontal tube 25. A second through hole 28 is arranged in the control part 26. A spring 29 is connected with one end of the control part 26 and the bottom wall of the horizontal tube 25 while a valve handle 30 is arranged at the other end of the control part 26. A locking plate 31 is arranged at the opened end; locking slots 32 are arranged on the locking plate 31. When the control part 26 is stretched and rotated by 90 degrees to ensure that two ends of the valve handle 30 are locked in the locking slots 32, the first through holes 27 and the second through hole 28 are communicated.

The pesticide discharging device includes a pesticide control box 8, two sides of which are hinged with a first iron handle 9 and a second iron handle 10. A first nozzle 11 is connected with the bottom end of the first iron handle while a second nozzle 12 is connected with the bottom end of the second iron handle, and the first nozzle 11 fits the second nozzle 12. The upper end of the first iron handle 9 is inserted into a first support rod 13 while the upper end of the second iron handle 10 is inserted into a second support rod 14. Bolts 15 are respectively arranged on the first support rod 13 and the second support rod 14 to fix the first support rod 13 and the first iron handle 9 as well as the second support rod 14 and the second iron handle 10. Handles 16 are arranged at the tops of the first support rod 13 and the second support rod 14. An upper connector 22 and a lower connector 23 are respectively arranged at the top and the bottom of the pesticide control box 8. The upper connector 22 is connected with the long hose 7 while the lower connector 23 is connected with a pesticide discharge tube 24. An outlet of the pesticide discharge tube 24 is located between the first nozzle 11 and the second nozzle 12.

In the embodiment, the rollers 2 are arranged at the bottom of the pesticide tank to help the pesticide tank 1 to move. Connection positions of the first iron handle 9 and the first support rod 13 as well as the second iron handle 10 and the second support rod 14 can be adjusted by the bolts 15 such that the heights of the handles 16 cane be adjusted to fit a pesticide applicator in use. The filter 3 is arranged in the pesticide tank 1 to block agglomerated granules so as to facilitate precision application of the granules. The inclined pesticide guide plate 4 is arranged in the pesticide tank 1 to help the granules to discharge and also to define a storage cavity 20; the storage cavity 20 can be used for storing small tools or a little spare pesticide and is convenient to use. Furthermore, the valve device 6 is arranged on the side connector 5. In use, the control part 26 is stretched and rotated by 90 degrees to ensure that the two ends of the valve handle 30 are locked in the locking slots 32; at this time, the first through holes 27 and the second through hole 28 are communicated; thus the valve device 6 is opened. If the valve device 6 needs to be closed, the valve handle 30 is stretched out of the locking slots 32; at this time, the control part 26 resets under the action of the spring 29, and the axis of the second through hole 28 is vertical to the first through hole 27; therefore, the valve device 6 is convenient to use.

The above are only preferred examples of the present invention and are not intended to limit the present invention. Although the present invention is described in detail with reference to the foregoing embodiments, it will be apparent to those skilled in the art that modifications can be made to the technical solutions described in the foregoing embodiments, or some of the technical features can be equivalently replaced. Any modifications, equivalent substitutions, improvements, etc. made within the spirit and scope of the present invention should be included within the protection scope of the present invention.

What is claimed is:

1. Portable pesticide application equipment with accurate application, comprising a pesticide tank, wherein rollers are arranged at the bottom of the pesticide tank; a filter is arranged in the pesticide tank; an inclined pesticide guide plate is arranged below the filter; a side connector is arranged at one side of the pesticide tank and also located between the filter and the pesticide guide plate; a valve device is arranged on the side connector while the side connector is connected with a long hose; the long hose is connected with a pesticide discharging device; the pesticide discharging device comprises a pesticide control box, two sides of which are hinged with a first iron handle and a second iron handle; a first nozzle is connected with the bottom end of the first iron handle while a second nozzle is connected with the bottom end of the second iron handle, and the first nozzle fits the second nozzle; the upper end of the first iron handle is inserted into a first support rod while the upper end of the second iron handle is inserted into a second support rod; bolts are respectively arranged on the first support rod and the second support rod to fix the first support rod and the first iron handle as well as the second support rod and the second iron handle; handles are arranged at the tops of the first support rod and the second support rod.

2. The portable pesticide application equipment with accurate application according to claim 1, wherein a feed port is arranged at the top of the pesticide tank, and two straps are arranged on one side of the pesticide tank.

3. The portable pesticide application equipment with accurate application according to claim 2, wherein a cap is arranged at the feed port in a threaded connection manner.

4. The portable pesticide application equipment with accurate application according to claim 1, wherein the pesticide guide plate as well as side walls and a bottom wall of the pesticide tank surround to define a storage cavity; a side door is hinged with one side, away from a side connector, of the storage cavity.

5. The portable pesticide application equipment with accurate application according to claim 1, wherein an upper connector and a lower connector are respectively arranged at the top and the bottom of the pesticide control box; the upper connector is connected with the long hose while the lower connector is connected with a pesticide discharge tube; an outlet of the pesticide discharge tube is located between the first nozzle and the second nozzle.

6. The portable pesticide application equipment with accurate application according to claim 1, wherein the valve device comprises a transversely arranged horizontal tube, the axis of which is vertical to the axis of the side connector; one end of the horizontal tube is closed while the other end thereof is opened; a control part is arranged in the horizontal tube.

7. The portable pesticide application equipment with accurate application according to claim 6, wherein first through holes are arranged in two sides vertical to the axis of the horizontal tube; a second through hole is arranged in the control part; a spring is connected with one end of the control part and the bottom wall of the horizontal tube while a valve handle is arranged at the other end of the control part.

8. The portable pesticide application equipment with accurate application according to claim 7, wherein a locking plate is arranged at the opened end of the horizontal tube, and locking slots are arranged on the locking plate; when the control part is stretched and rotated by 90 degrees to ensure that two ends of the valve handle are locked in the locking slots, the first through holes and the second through hole are communicated.

\* \* \* \* \*